Patented Nov. 30, 1937

2,100,392

UNITED STATES PATENT OFFICE 2,100,392

ALKYLARYLANTHRAQUINONE DYESTUFFS

Norman Hulton Haddock, Prestwich, and Colin Henry Lumsden, Gatley, England, assignors to Imperial Chemical Industries Limited, a corporation of Great Britain.

No Drawing. Application June 25, 1935, Serial No. 28,352. In Great Britain June 28, 1934

10 Claims. (Cl. 260—60)

This invention relates to new dyestuffs, and especially to new dyestuffs containing a long chain alkyl group.

According to our invention we make new dyestuffs containing a long chain alkyl group ($C_8$—$C_{20}$) by introducing this group, by means of an alkyl-aryl group. This introduction may be effected by known process for making dyestuffs containing tolyl and xylyl groups.

The new dyestuffs of our invention containing long-chain alkyl groups have improved properties, especially that of yielding dyeings which have improved fastness, including improved fastness to washing and milling. The new dyestuffs of our invention having the long alkyl chain directly attached to an aryl group, have this long alkyl chain very firmly attached and in consequence the dyestuffs have great chemical stability.

More specifically, according to the invention we make new dyestuffs containing a long chain alkyl ($C_8$—$C_{20}$) group by introducing into compounds already having the properties of dyestuffs, or using as an intermediate in the manufacture of dyestuffs a compound containing an alkylaryl group RR' where R stands for a long chain alkyl ($C_8$—$C_{20}$) and R' stands for phenylene, naphthylene, acenaphthylene or the like. Thus for example in carrying the invention into practical effect, we may use a long-chain alkylarylamine, such as an alkyl phenylamine or an alkyl naphthylamine, or we may use a long chain alkyl phenol, such as an alkyl phenol, or an alkyl naphthol, or we may use a long chain alkyl benzoic acid, a long chain alkyl benzyl alcohol or a long chain alkyl benzoyl halide; and we may carry the combination into effect according to the known methods of using similar intermediates, free from long chain alkyls, in making dyestuffs for instance, by diazotization and coupling, condensation, acylation, arylation and the like.

In the preparation of anthraquinone compounds of the type above described, we may condense the long chain alkylarylamine with an amino- or substituted amino-anthraquinone containing a reactive hydroxyl or halogen substituent, such as, for example, 2,4-dibromo-1-aminoanthraquinone, 4-bromo-1-methylaminoanthraquinone, 4-bromo-N-methylanthrapyridine, etc.

When we employ a long-chain alkyl phenol or thiophenol we may react it with a 2,3-dihalogen-1,4-diaminoanthraquinone with the production of mono- or di-phenoxy- or phenyl-thiol-, anthraquinones. When we employ a long chain alkyl thiophenol we may react it with an amino- or substituted amino-anthraquinone, containing a reaction halogen substituent. 4-bromo-1-methylamineanthraquinone and 4-bromo-N-methylanthrapyridine being examples of suitable aminoanthraquinones.

It will be understood that when necessary, one or more sulfonic or other water-solubilizing groupings may be introduced at one stage or other in the manufacture.

The new dyestuffs when containing a sufficiency of sulfonic acid groups dissolve in water to give solutions showing a tendency to gel. When applied in the usual way as acid dyestuffs they show remarkable melting and potting fastness, when compared with analogous dyestuffs not containing the characteristic long chain alkyl groups. Because of this they are adapted for use in place of chrome dyestuffs.

The invention also includes the new compounds obtainable by the above process, including dyestuffs containing an alkyl aryl group RR' hereinbefore defined, and various species belonging to this group as well as the individual dyestuffs described herein.

The invention also includes the application of the new dyestuff.

The following examples in which parts are by weight, illustrate, but do not limit the invention.

*Example 1*

10 parts of 1,3-dibromo-4-aminoanthraquinone, 13.5 parts of p-dodecylaniline, 2.5 parts of potassium acetate, 0.2 part of copper acetate and 20 parts of pyridine are stirred together at 115–120° C. for 24 hours. The mixture which gradually becomes blue in color during the reaction, is allowed to cool to 30° and the product filtered and washed successively with (a) pyridine, (b) alcohol and (c) water. The so-obtained 2-bromo-1-amino-4-(p-dodecyl) anilinoanthraquinone is a dark crystalline powder, m. p. 130–131° C., readily soluble in cold benzene with a bright blue colour.

For conversion to the water-soluble dyestuff, 10 parts of the intermediate product are dissolved in 40 parts of phenol and the solution mixed with a solution of 50 parts of sodium sulfite crystals in 75 parts of water. The mixture is heated under pressure at 170–175° C. for 8 hours and the phenol is then removed by steam distillation. The dyestuff, which is in the form of a jelly, is coagulated by adding salt, filtered and dried and ground. The ground dyestuff is extracted with cold benzene to remove a benzene-soluble impurity and finally, if desired, a further purification is given by heating a hot aqueous solution of the dyestuff with activated charcoal, filtering and reprecipitating with salt. The pure dyestuff gives a blue solution in warm water and dyes wool from a neutral or acid bath in pure blue shades which are fast to severe washing and alkaline milling.

*Example 2*

This describes the conversion of the dyestuff of Example 1 to a more highly sulfonated dyestuff.

10 parts of the dyestuff of Example 1 are dissolved in 100 parts of 100% sulfuric acid at 25°, 20 parts of 25% oleum are added and the mixture kept at 25–30° for 1 hour. The mixture is poured onto ice and afterwards filtered. The precipitate is dissolved in warm water, made alkaline with caustic soda solution and salt added. The precipitated dyestuff is filtered, washed with weak salt solution and dried.

The new dyestuff is readily soluble in cold water to a bright blue solution which dyes wool from a neutral or acid bath in bright blue shades which are rather redder than those of Example 1. The shades are fast to light, alkaline milling and severe washing.

*Example 3*

6.7 parts of 4-bromo-2-chloro-1-aminoanthraquinone, 12.8 parts of p-cetylaniline (made in a similar way to that used by Beran, loc. cit.) 2 parts of potassium acetate, 0.1 part of copper acetate and 14 parts of pyridine are stirred together at 115–120° C. for 16 hours. The reaction mixture is worked up in a similar manner to that of Example 1.

The so-obtained 2-chloro-1-amino-4-(p)-cetylanilino)-anthraquinone is a dark crystalline powder, soluble in benzene to a bright blue solution.

The chloro substituent is replaced by a sulfonic acid group as described in Example 1 and the dyestuff is then further sulfonated as in Example 2. The new dyestuff dissolves in cold water with a bright blue colour and dyes wool from a neutral or acid bath in bright blue shades similar to that of Example 2. The dyeings show excellent fastness to light, severe washing and alkaline milling.

*Example 4*

7.6 parts of 1:3-dibromo-4-aminoanthraquinone, 14 parts of p-octadecylaniline (made in a similar way to that used by Beran loc. cit.) 3 parts of potassium acetate, 0.1 part of copper acetate and 20 parts of pyridine are heated together at 115–120° C. for 20 hours. The mixture is cooled to 30°, an equal volume of alcohol is stirred in, the product is filtered, washed with acetone and finally washed with water.

The product when dry is a dark powder, soluble in benzene with a bright blue colour.

9 parts of the above product 120 parts of phenol 80 parts of water and 50 parts of sodium sulfite crystals are heated at 170–180° C. in an autoclave for 8 hours. The reaction mixture is poured into water and the phenol is removed by steam distillation. Salt is now added to coagulate the ice and when cold the product is filtered, washed with salt solution and dried. The crude dyestuff may be purified by extracting with ligroin until the soluble impurities are removed. The so-obtained product is only sparingly soluble in boiling water, and in order to obtain a technically valuable dyestuff, a further sulfonic acid group is introduced by sulphonating.

3.5 parts of the monosulfonic acid are dissolved in 30 parts of 100% sulfuric acid, 14 parts of 25% oleum are added, the mixture stirred at 25° for 2 hours, poured into ice and water, the product filtered and washed with salt solution. It is dissolved in 600 parts of hot water and the solution made alkaline with caustic soda, salt is added, the precipitate is filtered and washed with salt solution.

The new dyestuff is soluble in water with a bright blue colour. It dyes wool from a neutral or acid bath to bright blue shades, which are fast to severe washing and milling.

*Example 5*

72 parts of leucoquinizarin, 187 parts of p-dodecylaniline, 40 parts of boric acid and 360 parts of cresylic acid are mixed together and heated at 100° C. for two days. To the mixture is added its own volume of ethyl alcohol to facilitate further handling. It is then cooled to 40° and filtered. The residue is washed with cold alcohol until nothing more is removed, and then with water to remove boric acid.

The so-obtained product is if necessary crystallized from acetic acid. It is a dark green substance which dissolves in benzene to give a bright yellowish-green solution and in sulfuric acid to give a reddish-blue solution. It is probably a 1,4-di(dodecylphenylamino)anthraquinone.

The product is sulfonated as follows:—

22 parts are dissolved in 200 parts of 100% sulfuric acid at 20° C. and 36 parts of 21% oleum, are slowly added.

The mixture is stirred at 25–30° C. for 3 hours and then poured on 500 parts of ice. When the ice has melted the mixture is filtered and the residue is well pressed. It is then dissolved in hot water; the solution is made just alkaline by adding caustic soda, and the dyestuff is salted out, pressed and dried. When ground it is a green powder, dissolving in water to give a bluish-green solution, which froths and tends to form a jelly on cooling. The dyestuff dissolves in concentrated sulfuric acid to give a greenish-blue solution. It dyes wool from an acid bath in green shades which are fast to severe washing, alkaline milling and potting.

*Example 6*

32 parts of 1-bromo-4-methylaminoanthraquinone, 80 parts of p-dodecylphenol (made by treating the p-dodecylbenzene diazonium sulphate with boiling aqueous sulphuric acid) and 6 parts of powdered caustic soda are stirred together at 170–180° for 5 hours. The mixture is cooled to 70°, heated with alcohol containing a little caustic soda and when the temperature has fallen to 30° the product which separates is filtered and washed with a little alcohol. When dry it is a dark powder soluble in benzene with a blue-red color.

It is converted to the water-soluble dyestuff by dissolving in 10 parts by weight of 100% sulfuric acid at 25–30° C. and adding 25% oleum until a sample poured into water and filtered no longer dissolves in benzene.

The reaction mixture is poured onto ice and the solid matter filtered. It is suspended in 1000 parts of water at 90°, caustic soda solution is added until the mixture is alkaline and the product coagulated by adding salt. It is filtered and dried.

The new dyestuff dissolves in boiling water with a blue-red color and dyes wool from a neutral or acid bath in blue-red shades which have excellent fastness to severe washing and milling.

*Example 7*

6 parts of sodium 1-bromo-4-aminoanthraquinone-3-sulfonate are dissolved in 150 parts of water at 60° C. To this solution is added the solution of p-dodecylthiophenol, (which is obtained by treating 6.5 parts of p-dodecylbenzene diazonium chloride with sodium thylxanthate and hydrolyzing the xanthate ester with boiling alcoholic caustic soda) and the mixture is stirred at 70° for 2 hours. Salt is now added to coagulate the gelatinous mixture and the product is filtered and washed with dilute brine.

The dyestuff when dry is a dark red powder, soluble in water to give a bluish-red solution. Wool is dyed from neutral or acid baths in bluish-red shades, which have excellent fastness to severe washing and milling.

We claim:

1. Compounds of the formula

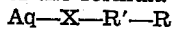

in which Aq stands for an anthraquinone radical; X stands for a linking radical of the class consisting of —NH—, —O—, —S—; R' stands for an arylene radical of the class consisting of phenylene, naphthylene and acenaphthylene, and R stands for a long chain alkyl group containing from 8 to 20 carbon atoms.

2. An alkylarylamino-anthraquinone wherein the alkyl group attached directly to the aryl radical contains from 8 to 20 carbon atoms.

3. A p-dodecylanilino-anthraquinone.

4. 2 - bromo - 1 - amino - 4(p-dodecylanilino) - anthraquinone.

5. Compounds of the formula

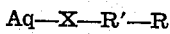

in which Aq stands for an anthraquinone radical, X stands for a linking radical of the class consisting of —NH—, —O—, —S—, R' stands for an arylene radical of the class consisting of phenylene, naphthylene and acenaphthylene, and R stands for a long chain alkyl group containing from 8 to 20 carbon atoms, and which carry in the molecule at least one sulfonic acid radical.

6. An alkylarylaminoanthraquinone wherein the alkyl group attached directly to the aryl radical contains from 8 to 20 carbon atoms, and which carries in the molecule at least one sulfonic acid radical.

7. A p - dodecylanilinoanthraquinonesulfonic acid.

8. 1-amino-4(p-dodecylanilino)-anthraquinone, carrying in the molecule at least one sulfonic acid radical.

9. The process which comprises reacting a halogeno-anthraquinone with an alkylaryl of the formula

wherein R' is an arylene radical of the class consisting of phenylene, naphthylene and acenaphthylene, X is a radical of the class consisting of NH$_2$—, —OH and —SH, and R is a long chain alkyl group containing from 8 to 20 carbon atoms.

10. The process which comprises reacting a halogeno-anthraquinone with an alkylaryl of the formula

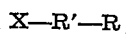

wherein R' is an arylene radical of the class consisting of phenylene, naphthylene and acenaphthylene, X is a radical of the class consisting of NH$_2$—, —OH and —SH, and R is a long chain alkyl group containing from 8 to 20 carbon atoms, and sulfonating the resulting product.

NORMAN HULTON HADDOCK.
COLIN HENRY LUMSDEN.